(12) United States Patent
Gresset

(10) Patent No.: US 11,108,432 B2
(45) Date of Patent: Aug. 31, 2021

(54) DEVICE AND METHOD FOR ESTIMATING INTERFERENCE AND RADIOFREQUENCY COMMUNICATION SYSTEM

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/959,588

(22) PCT Filed: Dec. 12, 2018

(86) PCT No.: PCT/JP2018/046671
§ 371 (c)(1),
(2) Date: Jul. 1, 2020

(87) PCT Pub. No.: WO2019/150811
PCT Pub. Date: Aug. 8, 2019

(65) Prior Publication Data
US 2020/0389205 A1 Dec. 10, 2020

(30) Foreign Application Priority Data

Feb. 2, 2018 (EP) ..................................... 18305112

(51) Int. Cl.
*H04B 1/715* (2011.01)
*H04B 17/336* (2015.01)
(Continued)

(52) U.S. Cl.
CPC ........... *H04B 1/715* (2013.01); *H04B 1/1036* (2013.01); *H04B 1/71* (2013.01); *H04B 17/336* (2015.01);
(Continued)

(58) Field of Classification Search
CPC .... H04B 1/715; H04B 17/336; H04B 1/1036; H04B 1/71; H04B 2001/7154;
(Continued)

(56) References Cited

U.S. PATENT DOCUMENTS 9,698,938 B2 * 7/2017 Lee .................. H04J 11/005
2012/0045012 A1 2/2012 Alapuranen
(Continued)

OTHER PUBLICATIONS

Ghosh et al., "Markov Chain Existence and Hidden Markey Models in Spectrum Sensing", Pervasive Computing and Communications. 2009. Percom 2009. IEEE International Conference on, IEEE, Piscataway, NJ, USA, Mar. 9, 2009, pp. 1-6.
(Continued)

*Primary Examiner* — Harry H Kim
(74) *Attorney, Agent, or Firm* — Birch, Stewart, Kolasch & Birch, LLP

(57) ABSTRACT

A method comprises:
Determining a set of all possible configurations of occupation or non-occupation of set of transmission bands, defined as a set of possible vectors satisfying at a time instant a non-overlapping condition of said radiofrequency system, said non-overlapping condition corresponding to the fact that only one interferer, among a set of possible interferers, can be active at a same time on each channel of said set of channels and forming, with contiguous channels, a transmission band,
Obtaining measurements of occupation of at least a part of said set of channels, at respective tune instants,
Performing probabilities calculations so as to determine, for each transmission band, an estimated activation rate, on the basis of said measurements, said estimated activation rate corresponding to an occupation rate of a transmission band by an interferer within said given observation time window.

15 Claims, 6 Drawing Sheets

(51) Int. Cl.
  *H04B 1/10* (2006.01)
  *H04B 17/345* (2015.01)
  *H04W 74/08* (2009.01)
  *H04J 11/00* (2006.01)
  *H04W 84/12* (2009.01)
  *H04B 1/71* (2011.01)

(52) U.S. Cl.
  CPC . *H04W 74/0808* (2013.01); *H04B 2001/7154* (2013.01)

(58) Field of Classification Search
  CPC ............... H04B 17/345; H04B 1/1027; H04W 74/0808; H04W 84/12; H04J 11/005
  See application file for complete search history.

(56) References Cited

U.S. PATENT DOCUMENTS

| 2016/0165617 A1* | 6/2016 | Sakamoto | H04W 72/048 370/329 |
| 2017/0180021 A1* | 6/2017 | Wang | H04B 7/0465 |
| 2018/0115977 A1* | 4/2018 | Fujita | H04W 16/04 |
| 2019/0297517 A1* | 9/2019 | Hyun | H04W 24/08 |

OTHER PUBLICATIONS

Hossain et al., "Wideband Spectrum Sensing for Cognitive Radios With Correlated Subband Occupancy", IEEE Signal Processing Letters, IEEE Service Center, Piscataway, NJ, US, vol . 18, No. 1, Jan. 1, 2011, pp. 35-38.

* cited by examiner

DEVICE AND METHOD FOR ESTIMATING INTERFERENCE AND RADIOFREQUENCY COMMUNICATION SYSTEM

TECHNICAL FIELD

The invention relates to systems which may use given radiofrequency channels, such as for example frequency hopping in ISM public bands (ISM for "Industrial, Scientific and Medical Radio Band"), and may be then subject to interference from other devices such as WiFi devices for example.

BACKGROUND ART

Examples of such systems possibly suffering from interferers can be for example a computer communicating device of an autonomous car, or, as another example, a communication-based train control having a radio technology communication device.

Interference issues could lead to severe problems in these autonomous vehicle applications.

Interference avoidance technologies based on cognitive radio could be further developed. For example, at each vehicle travel, measurements on the neighbouring interference can be fed back from the vehicle to a server along with the vehicle position. At the server, a database can be built to gather the measurements belonging to clusters of positions and frequency channels in a statistical function (for usual vehicle paths typically). Examples of such an implementation type are described for example in documents WO-2017/122548 and WO-2017/122549.

This knowledge can be thus used for performing radio resource management and monitoring of the radio system. In the context of vehicle radio monitoring, an identification method can be implemented typically to decide whether a WiFi device is responsible of a problem occurring at the radio level or not. However a drawback of that approach is that many measurements are needed to feed the database with. Signal analysis and recognition are well investigated topics. In general, a device would be specifically designed so as to provide the best detection performance, but in the background of the invention hereafter, the communicating system may be constrained by its own radio design.

With measurements of power on a frequency band smaller than the one of the Wifi signal, there is no known approach of determining the statistical occupation rate by one or several interferers in some a priori unknown transmission bands among the total number of WiFi transmission bands. One difficulty is the discrimination of interferers since these interferers can have an influence and be active in other transmission bands as well.

FIG. 8 shows the problem to be solved. The radiofrequency system provides a set of channels (from 1 to 16 in the example shown on FIG. 8). The index of the channels is labelled CHi. For example, each of these channels can have a bandwidth of 5 MHz.

An interfering radiofrequency system (such as Wifi system for example) can have one or several interferers, each of these interferers being susceptible to be active on a transmission band which is constituted by several contiguous channels. In the example of FIG. 8, the interfering system can have from 1 to 13 transmission bands, having an index labelled "TBi" in FIG. 8.

More particularly, in the example of FIG. 8, each transmission band TBi has a bandwidth of 20 MHz and:
TB1 extends on four contiguous channels 1 to 4,
TB2 extends on four contiguous channels 2 to 5,
TB3 extends on four contiguous channels 3 to 6,
Etc.
TB13 extends on four contiguous channels: 13,14,15,16.

It is worth noticing here that the index TBi has the same value than the first channel CHi of the contiguous channels. This index is therefore simply labelled "i" in the following description, and is assigned to an interferer index (from 1 to I, with I=13 in the example of FIG. 8).

It is worth also noticing here that two interferers can be active for example on two consecutive transmission bands overlapping on three channels. Moreover, an interferer can be active from time to time and not permanently.

A difficulty to be solved then is to discriminate on which transmission band an interferer is finally active within a given time window frame, and give typically an activation rate of that interferer in a corresponding transmission band within that time window.

SUMMARY OF INVENTION

The invention aims to improve the situation.

To that end, the invention proposes a method implemented by computer means for estimating interference on a radiofrequency system using a set of channels, said interference being caused by interferers of an interfering system using a set of transmission bands. More particularly, each of said transmission band extends on a plurality of contiguous channels of said set of channels.

The method comprises in particular:

Determining a set $\Omega$ of all possible configurations of occupation or non-occupation of said set of transmission bands, defined as a set of possible vectors $Z_k = [Z_{1,k}, \ldots, Z_{i,k}, \ldots Z_{I,k}]$ satisfying at a time instant k a non-overlapping condition of said radiofrequency system, said non-overlapping condition corresponding to the fact that only one interferer i, among a set of I possible interferers, can be active at a same time k on each channel of said set of channels and forming, with contiguous channels, a transmission band i, Obtaining measurements $X_1, \ldots, X_k, \ldots, X_K$ of occupation of at least a part of said set of channels, at respective time instants k: $0 < k \leq K$, where K defines a given observation time window, Performing probabilities calculations so as to determine, for each transmission band, an estimated activation rate $\tau$, on the basis of said measurements $X_1, \ldots, X_k, \ldots, X_K$, said estimated activation rate $\tau$ corresponding to an occupation rate of a transmission band i by an interferer within said given observation time window.

In an embodiment where said communicating system implements a frequency hopping on said channels, said step of obtaining measurements $X_1, \ldots, X_k, \ldots, X_K$ is performed according to a frequency hopping implementation.

In an embodiment, said probabilities calculations follow an expectation-maximum approach which iteratively approximates a maximum likelihood solution, according to two steps at each iteration t:

a) For a fixed estimate $\tau^{(t)}$, define the expectation $Q(\tau | \tau^{(t)})$ such that $$Q(\tau | \tau^{(t)}) = E_{Z \in \Omega | X, \tau^{(t)}}[\log P(X, Z | \tau)]$$

b) Find the estimate $\tau^{(t+1)}$ that maximizes $Q(\tau|\tau^{(t)})$:

$$\tau^{(t+1)} = \underset{\tau}{\arg\max}\, Q(\tau \mid \tau^{(t)}),$$

and successive t iterations of steps a) and b) lead to a converging solution giving said estimated activation rate $\tau^{(t+1)}$ for each transmission band.

In a first embodiment, each transmission band extends over J channels and said probabilities calculations comprise the steps:

CP1) computing the probabilities, $\forall k$, $\forall Z_k \in \Omega$, $P(X_k|Z_k)$, such as $$P(X_k \mid Z_k) = p_\eta\left(X_k - 1 + \prod_{j=0}^{J}(1 - Z_{f_{k-j},k})\right)$$

where $p_\eta(\ )$ defines a probability relative to an estimation error on the measurements vector $X_k$, CP2) computing then the probabilities $P(Z_k|\tau^{(t)})$, $\forall k$, $\forall Z_k \in \Omega$, CP3) computing the values, $\forall k$, $\forall Z_k$, $T_{Z_k,\tau^{(t)},X_k}$, with:

$$T_{Z_k,\tau^{(t)},X_k} = \frac{P(X_k \mid Z_k)P(Z_k \mid \tau^{(t)})}{\sum_{Z'_k \in \Omega} P(X_k \mid Z'_k)P(Z'_k \mid \tau^{(t)})}$$

CP4) iteratively computing $\tau^{(t+1)}$ from the previously computed $T_{Z_k,\tau^{(t)},X_k}$ and steps CP2) to CP4) are repeated iteratively until a stopping condition is met, the iteration index t being increased at each new iteration.

In this first embodiment, an approximation is made that the coefficients $Z_{i,k}$ are independent according to the interferer index i, and the probabilities calculations of $P(Z_k|\tau)$ are simplified into $P(Z_k|\tau^{(t)}) = \Pi_i P(Z_{i,k}|\tau_i^{(t)})$ where $P(Z_{i,k}|\tau_i^{(t)}) = (1-\tau_i^{(t)})(1-Z_{i,k}) + \tau_i^{(t)} \cdot Z_{i,k}$ and the iterative computations CP4) of $\tau^{(t+1)}$ are given by:

$$\forall i, \tau_i^{(t+1)} = \frac{1}{K}\sum_{k=1}^{K}\sum_{Z_k \in \Omega | Z_{i,k}=1} T_{Z_k,\tau^{(t)},X_k}$$

In a second embodiment (more precise but more complex), steps CP2) to CP4) are performed by:

i. Defining a matrix A as follows:

$\forall Z \in \Omega$, $j \in [1,|\Omega|]$ the index of Z in $\Omega$, and $\forall i$, $A(i,j)=Z_i$
Where $|\Omega|$ is the cardinality of $\Omega$, ii. Decomposing $A = U_A[\Delta_A 0_{I \times |\Omega|-I}][V_A^T W_A^T]^T$
where $V_A$ is of size I×I and $W_A$ is of size $(|\Omega|-I) \times I$ iii. Computing $H=[V_A^T 1_{I \times 1}]^T$ and $h(\tau^{(t)}) = [(\Delta_A^{-1} U_A^T \tau^{(t)})^T 1]^T$ iv. Initializing a vector $\varphi = H^\# h(\tau^{(t)})$ of size equal to I v. Computing $W_H$ from a decomposition of:

$$H = U_H[\Delta_H 0_{I+1 \times |\Omega|-I-1}][V_H^T W_H^T]^T$$

vi. Determining $\varphi$ on the basis of the calculation of $$W_H^T(W_H W_H^T)^{-1} W_H(\varphi - H^\# h(\tau^{(t)})) + H^\# h(\tau^{(t)})$$

vii. Getting $P(Z_k|\tau^{(t)}) = \varphi$
viii. Obtaining $\theta^{(t+1)}$ as:

$$\forall j, \theta_j^{(t+1)} = \frac{1}{K}\sum_{k=1}^{K} T_{Z_k=A_j,\tau^{(t)},X_k} \text{ and}$$

$$\tau^{(t+1)} = A\theta^{(t+1)}.$$

In this second embodiment, step vi) is implemented by successive iterations for refining $\varphi$ according to two conditions considered alternatively from one iteration to the other:
an orthogonal projection of $\varphi$ on an hyperplane such as:

$\varphi \leftarrow W_H^T(W_H W_H^T)^{-1} W_H(\varphi - H^\# h(\tau)) + H^\# h(\tau)$ and a projection of $\varphi$ in an hypercube such as:

$\varphi \leftarrow \max(\min(\varphi,1),0)$

In a possible embodiment detailed hereafter as an example, a number of said contiguous channels forming a transmission band is four, a total number of channels of said set of channels being sixteen.

In that example of embodiment, each of said channels extends over 5 MHz, whereas each of said transmission bands extends over 20 MHz with a spread spectrum technology implementation.

This example of embodiment can typically correspond to an implementation where said radiofrequency system corresponds to an ISM type communication system, while the interfering system corresponds to a Wifi type communication system.

In an example of embodiment further, said non-overlapping condition can derive from a multiple access implementation (CSMA/CA or CSMA/CD) performed by said radiofrequency system, said multiple access implementation defining communication timeslots, and said measurements $X_k$ being collected at each timeslot k.

The method can further include a selection step for communication of at least one channel among said set of channels, said selected channel being within a transmission band for which said estimated activation rate t is the lowest.

The invention aims also at a computer program comprising instructions for performing the method presented above, when these instructions are run by a processor. Examples of general algorithms of such a computer programs are shown of FIGS. 3 to 5 detailed below.

The invention aims also at a device for estimating interference on a radiofrequency system using a set of channels, said interference being caused by interferers of an interfering system using a set of transmission bands, each of said transmission band extending on a plurality of contiguous channels of said set of channels. More particularly, the device comprises a processing circuit for performing the method above, as shown in the example of FIG. 7 commented below.

The invention aims also at a radiofrequency communication system, comprising such a device for estimating interference susceptible to occur on channels to be used by the radiofrequency communication system.

The present invention is illustrated by way of example, and not by way of limitation, in the figures of the accompanying drawings, in which, further than FIG. 8 commented above.

DESCRIPTION OF EMBODIMENTS

A problem solved by the invention is the classification of interference (Wifi or not) according to measurements performed by a radio system. In the example disclosed hereafter, the radiofrequency system in stake has the following properties:

Frequency hopping on channels of 5 MHz band at a rate around 4 ms
Packets of 1.5 ms
Within each slot of 4 ms, CSMA/CA or CSMA/CD multiple access (two transmission attempts)
Measurements collected at each time slot
The WiFi system properties are
Spread spectrum technology on 20 MHz transmission bands
WiFi PHY layer packet of 200 µs in general (including acknowledgements ACK)
Transmission frame duration of around 100 ms in average (packet at transport layer)
CSMA/CA multiple access It is therefore assumed in the present example of implementation that each current transmission band of the interfering system is to be considered with an observation on bands of 5 MHz among the sixteen channels of the radio system. Each current transmission band extends on a total band of 20 MHz according to the WiFi system properties, which corresponds here to four contiguous channels of the radio system. Of course, the numbers of 16 channels and 4 contiguous channels are examples given here and may admit variants. Also, the transmission bands (also called "W-channels" hereafter) can be overlapping, producing thus a total of 13 transmission bands. By indexing the channels which are 5 MHz wide from 1 to 16, the transmission bands are defined by the aggregations of channels with indexes: [1 2 3 4],[2 3 4 5], . . . ,[12 13 14 15], [13 14 15 16].

Figure 1:
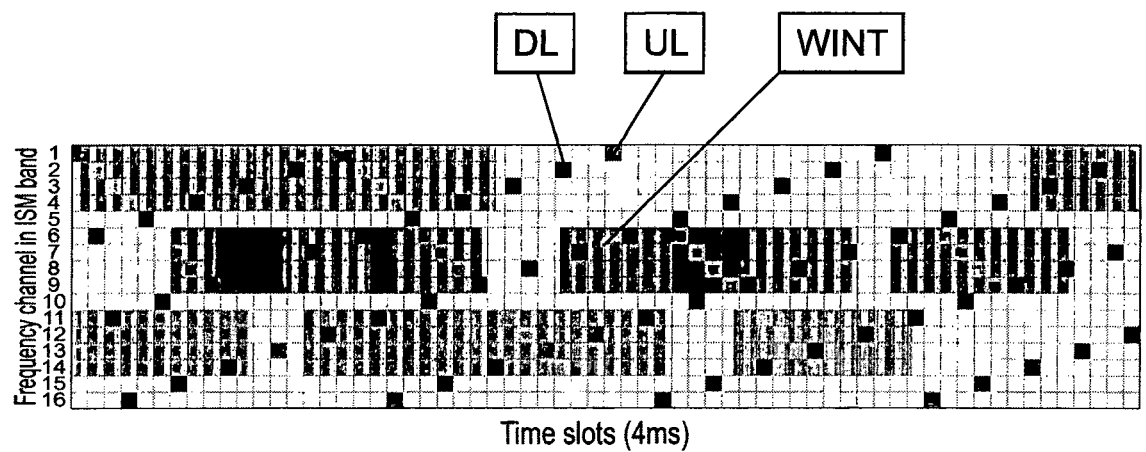
FIG. 1 shows schematically the frequency hopping communication scheme DL, UL implemented by the radiofrequency communication system according to the invention, compared to the noise scheme WINT due to interferers in a subset of contiguous channels (here fours channels), this subset being constant over time (over at least several successive timeslots) and defining a transmission band of the interfering system.

The system is able to detect neighbouring interferers and try another connection in case of collision detection. It is worth to add that these interferers are not impacted generally by the current radio system which usually uses directional antennas at the transmitter. The interferers are not deemed to be active according to a frequency hopping scheme but rather to be active on a fixed subset of several channels as shown in FIG. 1 commented below. The interferers respect however a non-overlapping condition according to which two interferers cannot overlap on a same channel at a same time, as a result of the CSMA/CA multiple access scheme. These observations explain the general wordings that:

each of the interferers is susceptible to be active on a transmission band formed by a plurality of contiguous channels of the whole set of channels, in particular at respective time instants k, and only one interferer can be active on each transmission band at a same time k, and for example when two transmission bands (having a width of 20 MHz) are overlapping on one or several channels (from one to three channels, each having a width of 5 MHz), an additional condition is that only one interferer can be active on each channel at a same time k.

In order to distinguish hereafter the transmission bands of the interfering system (for example WiFi) and the channels of the communicating system (for example ISM), the transmission bands are called "W-channel" hereafter, while the "channels" remain the channels of the communicating system.

An illustration of the coexistence of the radio system packets (uplink UL and downlink DL) and WiFi interference (WINT) is shown in FIG. 1, where the frequency/time usage of the ISM band is illustrated. Within the WiFi interference zones, the time occupancy slices into small PHY WiFi packets with collision avoidance mechanisms. Roughly a half of the frequency hops are used for downlink and the other half for uplink. Thus, by configuring a given observation time window, the number of interference measurements on each channel might be different. Some channels might even not have any measurement opportunity within that time window.

Hereafter, the following notations are used:

k is a time instant, i.e. a hop of the current radio system. More precisely, a time window of K time instants is considered.

$X_k$ is an interference observation, over one channel in the present example of embodiment, at time instant k: $0 < k \leq K$. Each $X_k$ can correspond to a power measurement or of a signal to noise ratio, sounded in each channel, or to a simulation according to a given scheme.

$f_k$ is the index of the frequency channel sounded at time instant k.

$Z_{i,k}$ is a random variable stating if interference is active on the i-th W-channel (out of I) at a time instant k.

As a result of the CSMA/CA multiple access scheme, two interferers cannot overlap at the same time, which can be mathematically written as:

$$Z_{i,k}=1 \Rightarrow \forall j \neq i/i-3 \leq j \leq i+3, Z_{j,k}=0 \qquad (1)$$

The random variables are independent in time, i.e., $$\forall i, \forall (k,k'), k \neq k', E[Z_{i,k} Z_{i,k'}]=0 \qquad (2)$$

Where E[ ] denotes the mathematical expectation. When this expectation must be performed on a finite set of values, the expectation is replaced and approximated by an arithmetic mean.

It is considered at first a set $\Omega$ defined as a set of possible vectors $Z_k=[Z_{i,k} \ldots Z_{I,k}]$ satisfying at a time instant k the non-overlapping condition.

Figure 2:
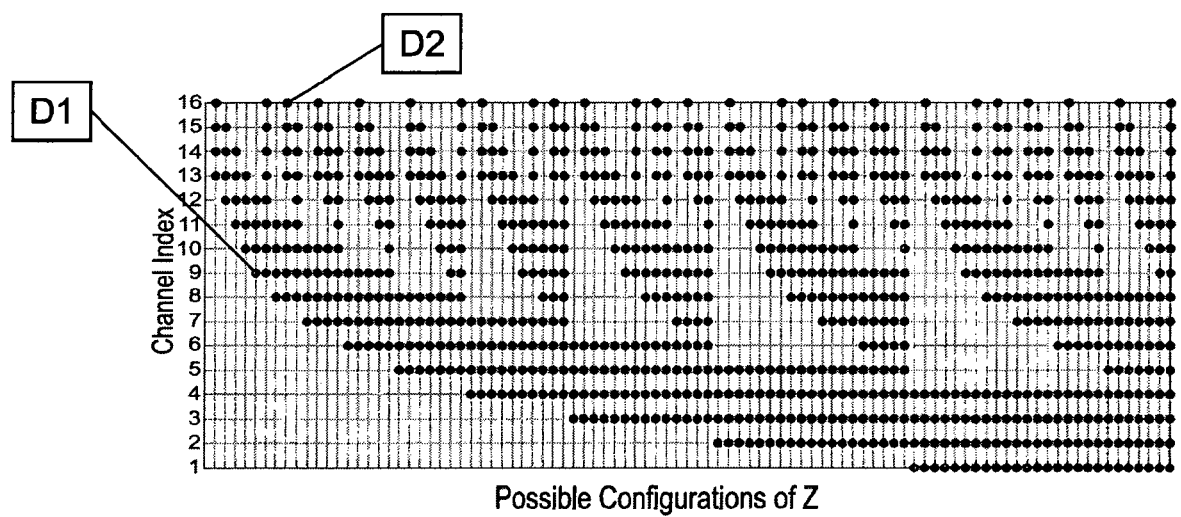
FIG. 2 shows all the possible configurations of the set $\Omega$ of occupation of interferers or non-occupation of the channels of the whole set of channels.

FIG. 2 illustrates by dots D1 (light grey) the set $\Omega$ over 16 channels of 5 MHz in the ISM band of 80 MHz. One dot D1 illustrates then the starting index i of a W-channel, and three dots D2 (black dots, above and beneath a dot D1, when possible) illustrate the channels indexes i+1, i+2 and i+3 also allocated to the WiFi interferer with 20 MHz-wide band for the associated W-channel composed of the four channels i, i+1, i+2, i+3.

For example, when taking a channel index 9 having a D1 dot at the first third of the X-axis (one abscissa representing one possible configuration for a vector Z in the set Ω), the W-channel 9 is composed of the channels 9,10,11,12. The D1 dot indicates that the channel 9 is the index used to identify this 20 MHz-wide W-channel. It can be observed that, because two W-channels cannot overlap at the same time, only the W-channels starting at index 13,5,4,3,2,1 can coexist at the same time of the W-channel starting at index 9. According to another example of FIG. 2 corresponding to another possibility of the set Ω, the configuration with W-channels starting at index 1,5,9,13 with four interferers all active at the same time is possible and shown as the last configuration on the right end of FIG. 2.

It can be observed that 95 allocations with at least one interferer and satisfying the CSMA/CA non overlapping properties between interferers are possible (95 abscissa along the X-axis).

One notation which is used also below also is:

$\tau_i$, being the activation rate of the i-th interferer, i.e.
$\tau_i = E_k[Z_{i,k}]$ where $E_k[.]$ denotes the mathematical expectation over the different time instant. When this expectation must be performed on a finite set of values, i.e., when considering a finite time window, the expectation is replaced and approximated by an arithmetic mean.

The problem to solve is the computation of the set $\tau$ from the vector of observations $X=[X_1, \ldots, X_K]$.

The maximum a posteriori:

$$\hat{\tau} = \arg\max_\tau P(\tau \mid X) \tag{3}$$

can be converted into a maximum likelihood problem by considering that all the variables $\tau$ are equiprobable a priori:

$$\hat{\tau} = \arg\max_\tau P(X \mid \tau) \tag{4}$$

This involves that before receiving any observation, there is no information to say that one of the activation rates $\tau_i$ for the i-th W-channel is higher than another.

Furthermore, the latent variables Z are also equiprobable a priori such that:

$$\hat{\tau} = \arg\max_\tau \sum_{Z \in \Omega} P(X, Z \mid \tau) \tag{5}$$

which gives a new optimization problem to solve.

The problem (5) is intractable because of the high dimensionality of the set of possible vectors Z ($\in \Omega$) and $\tau$. Thus, an expectation-maximum approach which iteratively approximates the maximum likelihood solution is used instead, as proposed here after.

That approach comprises two steps, at each iteration t:

a) For a fixed estimate $\tau^{(t)}$, define the expectation $Q(\tau|\tau^{(t)})$ such that $$Q(\tau|\tau^{(t)}) = E_{Z \in \Omega|X, \tau^{(t)}}[\log P(X,Z|\tau)] \tag{6}$$

b) Find the estimate $\tau^{(t+1)}$ that maximizes $Q(\tau|\tau^{(t)})$:

$$\tau^{(t+1)} = \arg\max_\tau Q(\tau \mid \tau^{(t)}) \tag{7}$$

The invention proposes then an application of this iterative approach, by implementing computations which are specific to the problem raised above.

Figure 3:
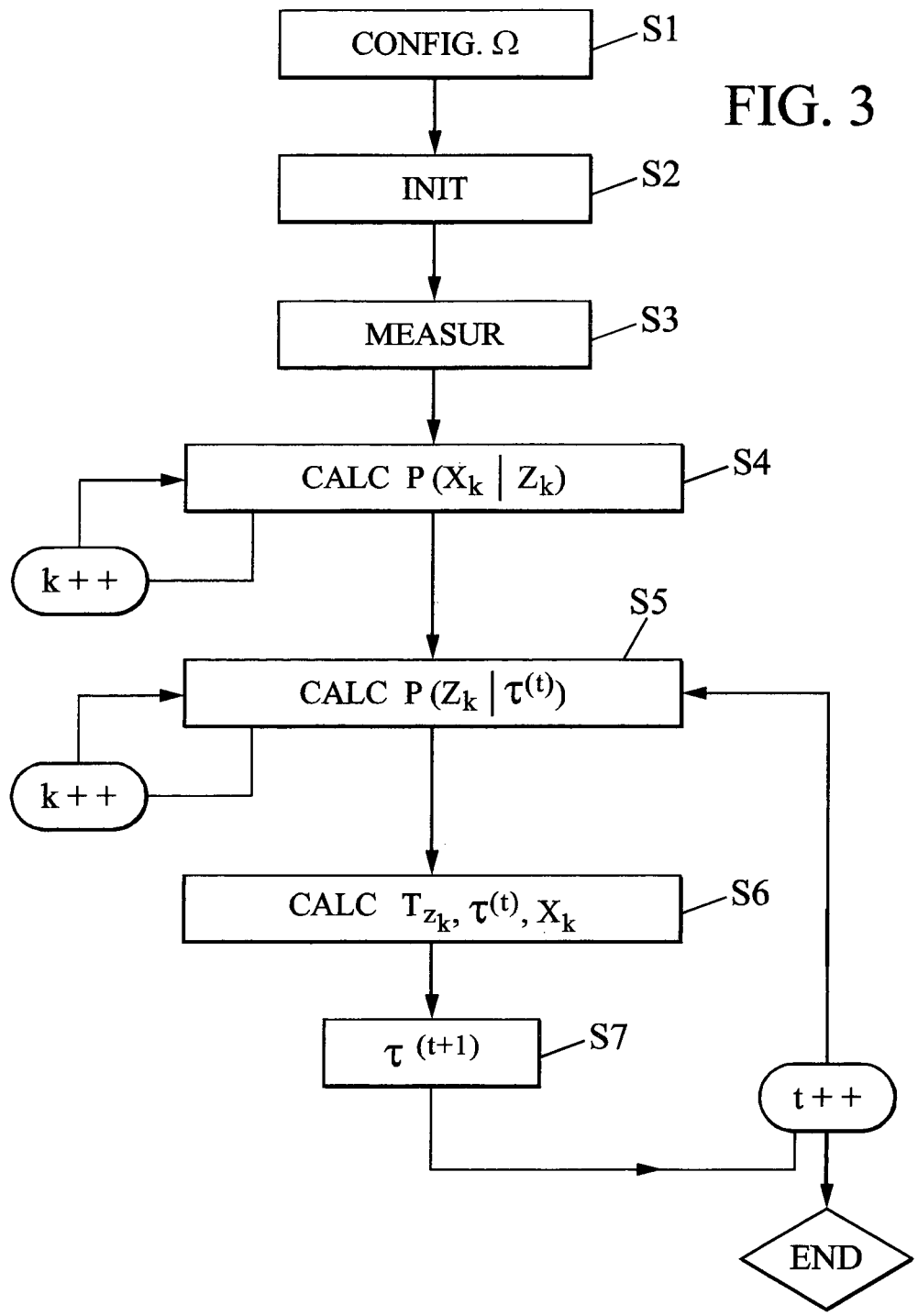
FIG. 3 shows an example of the main steps of a method according to the invention.

Referring to FIG. 3, a possible implementation of these computations can be summarized as follows:

in step S1, determining the set Ω of possible configurations, in step S2, initializing $\tau^{(1)}$ with zero values and t at t=1; where t represents an iteration index in the iterative processing.

in step S3, collecting measurements $X_1, \ldots, X_K$, in step S4, computing the probabilities, $\forall k$, $\forall Z_k \in \Omega$, $P(X_k|Z_k)$, such as $$P(X_k|Z_k) = p_\eta(X_k - 1 + \Pi_{j=0}^3(1-Z_{f_{k-1},k}))$$

where $p_\eta()$ defines the probability relative to the estimation error on the observation $X_k$.

in step S5, computing the probabilities, $\forall k$, $\forall Z_k \in \Omega$, $P(Z_k|\tau_{(t)})$, with two possible embodiments as described below;

in step S6, computing the values $T_{Z_k,\tau^{(t)},X_k}$, $$\forall k, \forall Z_k, T_{Z_k,\tau^{(t)},X_k} = \frac{P(X_k \mid Z_k)P(Z_k \mid \tau^{(t)})}{\sum_{Z'_k \in \Omega} P(X_k \mid Z'_k)P(Z'_k \mid \tau^{(t)})} \tag{10}$$

in step S7, computing $\tau^{(t+1)}$ from the previously computed $T_{Z_k,\tau^{(t)},X_k}$ Steps S5, S6 and S7 are related to a given iteration index t and are repeated iteratively until a stopping condition is met, such as a maximum number of iterations. At the end of each new iteration, the iteration index t is increased.

Two possible embodiments can be implemented for performing the calculation probabilities.

In a first embodiment, the calculation of the probabilities in step S5 can simply be implemented as follows:

$$P(Z_k|\tau^{(t)}) = \Pi_i P(Z_{i,k}|\tau_i^{(t)}) \tag{8}$$

where $$P(Z_{i,k}|\tau_i^{(t)}) = (1-\tau_i^{(t)})(1-Z_{i,k}) + \tau_i^{(t)} \cdot Z_{i,k}. \tag{9}$$

and in step S7, the increment on t can be such that:

$$\forall i, \tau_i^{(t+1)} = \frac{1}{K}\sum_{k=1}^{K}\sum_{Z_k \in \Omega | Z_{i,k}=1} T_{Z_k,\tau^{(t)},X_k}$$

Where the values $T_{Z_k,\tau^{(t)},X_k}$ are obtained from step S6.

In a second embodiment rather based on a matrix computation, the following iterative procedure is applied, as detailed below referring to FIG. 5:

i. Define the matrix A as follows:

$\forall Z \in \Omega$, j $\in[1, |\Omega|]$ the index of Z in Ω and $\forall i$, $A(i,j)=Z_i$, and $|\Omega|$ is the cardinality of Ω.

(this matrix A visually corresponds then to FIG. 2)

ii. Decompose: (obtained with an "SVD algorithm")

$$A = U_A[\Delta_A 0_{I \times |\Omega|-I}][V_A^T W_A^T]^T$$

where $V_A$ is of size I×I and $W_A$ is of size $(|\Omega|-I) \times I$.

iii. Compute $H=[V_A^T 1_{I\times 1}]^T$ and $h(\tau^{(t)})=[(\Delta_A^{-1}U_A^T\tau^{(t)})^T 1]^T$ iv. Initialize a vector $\varphi=H^\# h(\tau^{(t)})$ of size equal to I.

v. Compute $W_H$ from the decomposition obtained with an SVD algorithm $$H=U_H[\Delta_H 0_{I+1\times|\Omega|-I-1}][V_H^T W_H^T]^T$$

vi. Then, repeat the following two steps until a maximum number of iterations is reached or until no modification of $\varphi$ is obtained $$\varphi \leftarrow W_H^T(W_H W_H^T)^{-1} W_H(\varphi - H^\# h(\tau^{(t)})) + H^\# h(\tau^{(t)}) \quad \text{A.}$$

$$\varphi \leftarrow \max(\min(\varphi,1),0) \quad \text{B.}$$

vii. Get $P(Z_k|\tau^{(t)})=\varphi$ viii. And for performing step S7, $\theta^{(t+1)}$ is obtained as $$\forall j, \theta_j^{(t+1)} = \frac{1}{K}\sum_{k=1}^K T_{Z_k=A_j,\tau^{(t)},X_k} \text{ and}$$

$$\tau^{(t+1)} = A\theta^{(t+1)}.$$

A detailed description of the embodiments presented above is now given below.

Starting from the expectation maximization procedure presented relatively to main steps a) and b) above, a development of each term according to the specific problem addressed by the invention is proposed hereafter.

The proposed algorithm involves an iterative estimation of the variable $\tau$. In a current iteration t, the variable $\tau$ is estimated by $\tau^{(t)}$, and is refined into the output $\tau^{(t+1)}$ of said iteration. In the following, T denotes a mathematical variable and is used in the following for deriving expressions useful for the computation of $\tau^{(t+1)}$. For example, a general expression of $P(Z_k|\tau)$ will be expressed, and the computation of $P(Z_k|\tau^{(t)})$ can be obtained by replacing $\tau$ by $\tau^{(t)}$ in the expression of $P(Z_k|\tau)$. The random variables $X_k$ are mutually independent in time as well as the random variables $Z_k \in \Omega$. Thus, it is possible first to decompose equation (6) of general step a) above into:

$$Q(\tau|\tau^{(t)}) = \sum_k E_{Z_k \in \Omega|X_k,\tau^{(t)}}[\log P(X_k, Z_k|\tau)] \quad (11)$$

$$= \sum_k \sum_{Z_k \in \Omega} P(Z_k|X_k,\tau^{(t)})\log P(X_k, Z_k|\tau) \quad (12)$$

Furthermore, $P(Z_k|X_k,\tau^{(t)})$ can be computed by using the Bayes theorem and the Law of total probability, as follows:

$$T_{Z_k,\tau^{(t)},X_k} = P(Z_k|X_k,\tau^{(t)}) \quad (13)$$

$$= \frac{P(X_k|Z_k,\tau^{(t)})P(Z_k|\tau^{(t)})}{P(X_k|\tau^{(t)})} \quad (14)$$

$$= \frac{P(X_k|Z_k,\tau^{(t)})P(Z_k|\tau^{(t)})}{\sum_{Z_k' \in \Omega} P(X_k|Z_k',\tau^{(t)})P(Z_k'|\tau^{(t)})} \quad (15)$$

By using the conditional probabilities, one can state further that $$P(X_k,Z_k|\tau)=P(X_k|Z_k,\tau)P(Z_k|\tau) \quad (16)$$

The optimization problem can be thus stated as follows: In the considered system, when $Z_k \in \Omega$ is fixed, $X_k$ is not dependent on, which leads to $$P(X_k|Z_k,\tau)=P(X_k|Z_k) \quad (17)$$

More precisely, since $X_k$ is only potentially impacted by the interferers indexes $[f_k-3, f_k]$ and their non-concurrent activation at time k, $P(X_k|Z_k,\tau)$ can be determined by:

$$P(X_k|Z_k,\tau)=P(X_k|Z_k)=P(X_k|Z_{f_k-3,k},\ldots,Z_{f_k,k}) \quad (21)$$

Hereafter, $p_\eta(.)$ is the notation for the measurement noise probability density function of the model $X_k=Y_k+\eta_k$, where:
$Y_k=0 \Leftrightarrow \forall 0 \leq j \leq 3, Z_{f_{k-j},k}=0$, and
$Y_k=1$ otherwise.
Then:

$$Y_k=1-\Pi_{j=0}^3(1-Z_{f_{k-j},k}) \quad (22)$$

and in this case:

$$P(X_k|Z_k)=p_\eta(X_k-1+\Pi_{j=0}^3(1-Z_{f_{k-j},k})) \quad (23)$$

For example, in most cases, the power observation samples are impacted by a chi-square noise, which involves that $p_\eta(.)$ is defined as the probability density function, and parametrized according to the inherent thermal noise and number of signal samples used to compute a power observation. Another option is to consider that the noise effect is negligible, in this case $p_\eta(x)=1$ if and only if $x=0$ and has a zero value otherwise. Furthermore, by using equations (12), (15), (16), (23), one can get to:

$$Q(\tau|\tau^{(t)})=\Sigma_k \Sigma_{Z_k \in \Omega} T_{Z_k,\tau^{(t)},X_k}(\log P(X_k|Z_k)+\log P(Z_k|\tau)) \quad (18)$$

Thus, the optimization equation (7) becomes $$\tau^{(t+1)} = \underset{\tau}{\operatorname{argmax}}\left(\sum_k \sum_{Z_k \in \Omega} T_{Z_k,\tau^{(t)},X_k} \log P(Z_k|\tau)\right) \quad (19)$$

Figure 4:
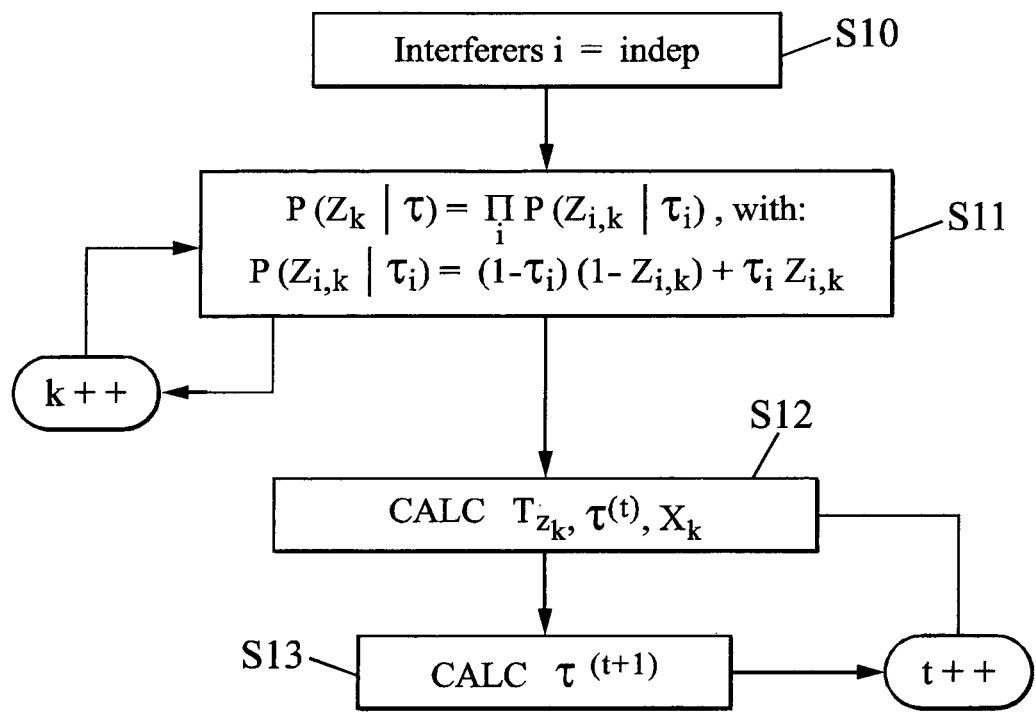
FIG. 4 shows an example of the main steps of a method according to a first embodiment of the invention.

Finally, as presented above with reference to FIG. 4, main steps of the process are:

Computing the probabilities, $\forall k, \forall Z_k \in \Omega, P(X_k|Z_k)$ (step S4)

Computing the probabilities, $\forall k, \forall Z_k \in \Omega, P(Z_k|\tau^{(t)})$ (step S5)

Computing the values $T_{Z_k,\tau^{(t)},X_k}, \forall k$ $$T_{Z_k,\tau^{(t)},X_k} = \frac{P(X_k|Z_k)P(Z_k|\tau^{(t)})}{\sum_{Z_k' \in \Omega} P(X_k|Z_k')P(Z_k'|\tau^{(t)})} \text{ (step S6)} \quad (20)$$

Computing $\tau^{(t+1)}$ from the solution of equation (19) (step S7).

Steps S5, S6, S7 are repeated iteratively until convergence. It is shown further here that convergence can be reached advantageously. The computation of $P(X_k|Z_k)$, and $P(Z_k|\tau)$ is detailed in the following. The computation of $P(Z_k|\tau^{(t)})$ which is required for $T_{Z_k,\tau^{(t)},X_k}$ is obtained by replacing $\tau$ by $\tau^{(t)}$ in the expression of $P(Z_k|\tau)$. Finally, the optimization of $\tau^{(t+1)}$ can be obtained in closed form, according to the definition of $P(Z_k|\tau)$, as shown hereafter.

FIG. 4, commented below, details the first embodiment briefly presented above. The method according to this first embodiment starts with a first step S10 where an approximation is made for defining the expression of $P(Z_k|\tau)$, which is both needed to solve the optimization problem (19) as a function of $\tau$, and to compute the value $P(Z_k|\tau^{(t)})$ which is required for $T_{Z_k,\tau^{(t)},X_k}$.

More precisely, the $Z_{i,k}$ random variables are not independent since they are linked by the CSMA/CA contention protocol: they are mutually independent according to k but not to the interferer index i. However, it is made here the approximation that they are independent according to i, and then the coefficients $Z_{i,k}$ only depend on $\tau_i$. This approximation is fully justified in the case where few interferers are expected to be present, such as for example a train path in the countryside. In the case where several interferers are expected such as for an urban path, the second embodiment might be preferred.

Thus, in the first embodiment, in step S11, the probability calculation $P(Z_k|\tau)$ can be given as:

$$P(Z_k|\tau) = \Pi_i P(Z_{i,k}|\tau_i) \quad (24)$$

where, by definition, the activation rate of the probability of having an interference ($Z_{i,k}=1$) is $\tau_i$ such that:

$$P(Z_{i,k}|\tau_i) = (1-\tau_i)(1-Z_{i,k}) + \tau_i \cdot Z_{i,k} \quad (25)$$

Then, in step S12, the expression of $T_{Z_k,\tau^{(t)},X_k}$ is computed by using, in equation (20), the expression $$P(Z_{i,k}|\tau_i^{(t)}) = (1-\tau_i^{(t)})(1-Z_{i,k}) + \tau_i^{(t)} \cdot Z_{i,k} \quad (26)$$

Finally, in step S13, the expression of $\tau^{(t+1)}$ can be calculated until a convergence condition is reached over t.

More precisely, according to this approximation, the maximization problem (19) is concave. The zero of the derivative of the function to be optimized according to $\tau_i$, allows to get a relationship providing $\tau_i^{(t+1)}$ as $$\sum_k \sum_{Z_k \in \Omega} T_{Z_k,\tau^{(t)},X_k} \frac{2Z_{i,k}-1}{(1-\tau_i^{(t+1)})(1-Z_{i,k}) + \tau_i^{(t+1)} \cdot Z_{i,k}} = 0 \quad (27)$$

Since $Z_{i,k} \in \{0,1\}$, this equation can be simplified into $$\sum_k \sum_{Z_k \in \Omega | Z_{i,k}=0} T_{Z_k,\tau^{(t)},X_k} \frac{1}{(1-\tau_i^{(t+1)})} = \sum_k \sum_{Z_k \in \Omega | Z_{i,k}=1} T_{Z_k,\tau^{(t)},X_k} \frac{1}{\tau_i^{(t+1)}} \quad (28)$$

which gives $$\tau_i^{(t+1)} = \frac{\sum_k \sum_{Z_k \in \Omega | Z_{i,k}=1} T_{Z_k,\tau^{(t)},X_k}}{\sum_k \sum_{Z_k \in \Omega} T_{Z_k,\tau^{(t)},X_k}} \quad (29)$$

As a remark, in this case:

$$\Sigma_{Z_k \in \Omega} T_{Z_k,\tau^{(t)},X_k} = 1 \quad (30)$$

which leads to $$\tau_i^{(t+1)} = \frac{1}{K} \sum_{k=1}^{K} \sum_{Z_k \in \Omega | Z_{i,k}=1} T_{Z_k,\tau^{(t)},X_k} \quad (31)$$

The calculations according to this first embodiment are simpler and necessitate less computation resources than the second embodiment, provided that the approximation made in step S10 can be justified.

The second embodiment is detailed below with reference now to FIG. 5. Here, the approximation that the interferers are inter-independent cannot be valid for the calculations of $P(Z_k|\tau)$. The approach hereafter is rather based on matrix computations, and can be more complex than the first embodiment. It is shown however that some observations simplifying the calculations can be made. In calculation step S21 indeed, it can be observed that the probabilities $p(Z_k)$ are linked to $\tau$ by the following expression $$\tau_i = E[Z_{i,k}] = \Sigma_{Z_k \in \Omega} Z_{i,k} p(Z_k) \quad (32)$$

This property can be used then to evaluate $P(Z_k|\tau)$ as detailed below.

Noting hereafter the term $\varphi_j = p(Z_k = A_j|\tau)$, the probability vectors $\varphi$ and $\tau$ are linked by a matrix A having the dimensions I×|Ω| and defined in step S22 as follows:

$$\forall Z \in \Omega, j \in [1,|\Omega|] \text{ is the index of } Z \text{ in } \Omega, \text{ and } \forall i, \forall (i,j) = Z_i \quad (33)$$

$A_j$ denotes the j-th column of A, which is equal to the j-th element of Ω.

Thus, $\varphi$ is a vector of size |Ω| that characterizes $P(Z_k|\tau)$. Furthermore, $\varphi$ must be a probability vector. Thus, the set of solutions can be written as $$\begin{cases} \tau = A\varphi \\ \sum_{j=1}^{|\Omega|} \varphi_j = 1 \\ \forall j, \ 0 \leq \varphi_j \leq 1 \end{cases} \quad (34)$$

This system (34) is under-determined. It is proposed hereafter two algorithms to find a suitable solution satisfying the constraints.

At first, in step S23, matrix A is decomposed as follows:

$$A = U_A[\Delta_A 0_{I \times |\Omega|-I}][V_A^T W_A^T]^T \quad (35)$$

where $V_A$ is of size I×I and $W_A$ is of size (|Ω|−I)×I.

Thus, the set of solutions $\varphi$ satisfying $\tau = A\varphi$ can be written $$\varphi = A^{\#}\tau + W_A^{\ x} \quad (36)$$

where $A^{\#}$ is the Moore-Penrose pseudo-inverse matrix of A, and x is any vector of size |Ω|−I. Thus, the solution $\varphi$ belongs to a hyperplane having the equation $$V_A \varphi = V_A A^{\#} \tau = \Delta_A^{-1} U_A^T \tau \quad (37)$$

The constraint $\Sigma_j \varphi_j = 1$ also puts $\varphi$ onto a hyperplane. Thus, the intersection of the two hyperplanes can be written as $$H\varphi = h(\tau) \quad (38)$$

where $H = [V_A^T 1_{I \times 1}]^T$ and $h(\tau) = [(\Delta_A^{-1} U_A^T \tau)^T 1]^T$.

Then, matrix H can be decomposed also as:

$$H = U_H[\Delta_H 0_{I+1 \times |\Omega|-I-1}][V_H^T W_H^T]^T \quad (39)$$

In step S24, the orthogonal projection of the point y on the hyperplane defined by $H\varphi = h(\tau)$ is given by $$\varphi = W_H^T(W_H W_H^T)^{-1} W_H(y - H^\# h(\tau)) + H^\# h(\tau) \quad (40)$$

Moreover, in step S25, the vector $\varphi$ must also satisfy the constraint $\forall j$, $0 \leq \varphi_j \leq 1$. Any vector y can be projected in the hypercube defined by the constraint by applying the per dimension max(.,.) and min(.,.) functions as max(min($\varphi$,1), 0).

As it is difficult to both satisfy the constraints at the same time, it is proposed to alternate the calculations according to steps S24 and S25 between two operations in order to refine $\varphi$, namely:

An orthogonal projection of $\varphi$ on the hyperplane, according to step S24:

$$\varphi \leftarrow W_H^T(W_H W_H^T)^{-1} W_H(\varphi - H^\# h(\tau)) + H^\# h(\tau) \quad (41)$$

a projection of $\varphi$ in the hypercube, according to step S25:

$$\varphi \leftarrow \max(\min(\varphi,1),0) \quad (42)$$

Starting from an initialization of $\varphi$ given by $\varphi = H^\# h(\tau)$, in step S26, the two operations are iterated several times. More precisely, several possible configurations can be tested until both conditions are met (projection on the hyperplane 41, and projection in the hypercube 42). It has been shown that this system converges to one solution actually. The steps S24 and S25 are repeated until a convergence condition is met which is for example given by a maximum number of iterations or a detection that the values $\varphi$ has not changed in the last two iterations.

The operation described above is used for computing $\varphi$ by using $h(\tau^{(t)})$ instead of $h(\tau)$. Then, it is possible to extract directly $P(Z_k = A_j | \tau^{(t)}) = \varphi_j$ and compute the $T_{Z_k, \tau^{(t)}, X_k}$ values accordingly, in step S27.

The expression of $\tau^{(t+1)}$ can be obtained from the optimization problem (19), by first introducing A such that:

$$\tau^{(t+1)} = \underset{\tau}{\arg\max}\left(\sum_k \sum_{j=1}^{|\Omega|} T_{Z_k = A_j, \tau^{(t)}, X_k} \log P(Z_k = A_j | \tau)\right) \quad (43)$$

and then substituting the variable $\tau^{(t+1)}$ by $\theta^{(t+1)}$, and $P(Z_k = A_j | \tau)$ with $\varphi_j$, so that finally:

$$\theta^{(t+1)} = \underset{\varphi}{\arg\max}\left(\sum_k \sum_{j=1}^{|\Omega|} T_{Z_k = A_j, \tau^{(t)}, X_k} \log \varphi_j\right) \quad (44)$$

such that $\sum_{j=1}^{|\Omega|} \varphi_j = 1$ and $\forall j$, $0 \leq \varphi_j \leq 1$ Then, by using $\tau_{j=1}^{|\Omega|} T_{Z_k = A_j, \tau^{(t)}, X_k} = 1$, this is solved into $$\forall j, \theta_j^{(t+1)} = \frac{1}{K}\sum_{k=1}^{K} T_{Z_k = A_j, \tau^{(t)}, X_k} \quad (45)$$

And finally, $\tau^{(t+1)} = \Delta \theta^{(t+1)}$ is calculated in step S28.

Figure 6A:
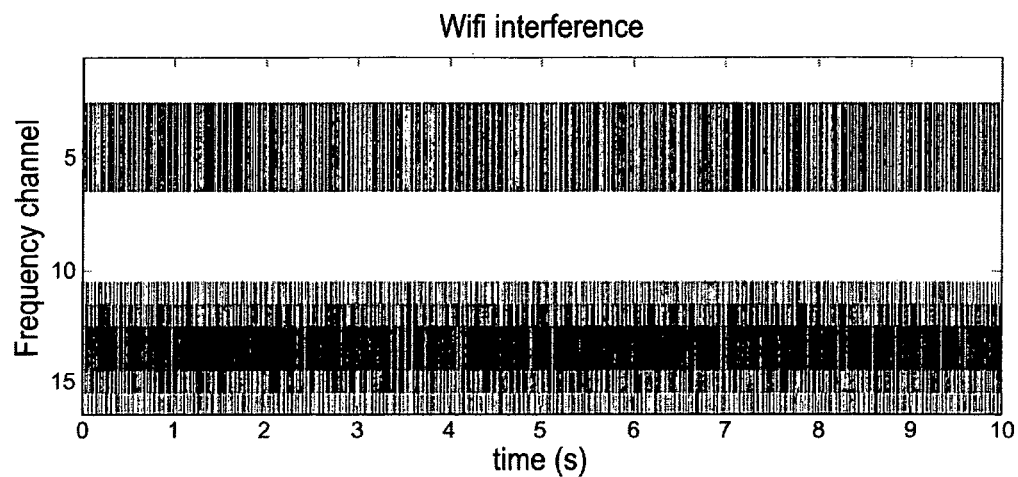
FIG. 6A shows an example of a simulation of three interferers being active essentially on four transmission bands.
Figure 6B:
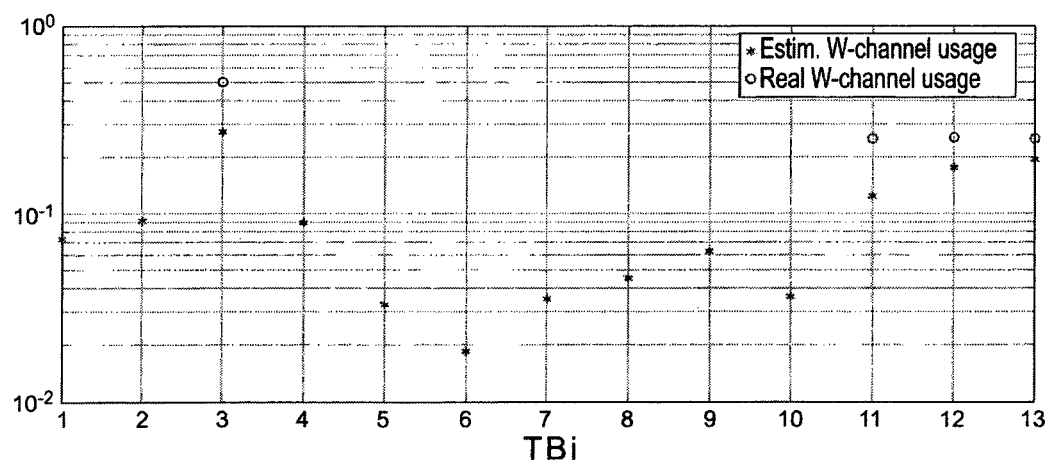
FIG. 6B shows then the determination of the four most occupied transmission bands by these interferers thanks to the implementation of the invention.

FIGS. 6A and 6B show respectively a simulation of four Wifi interferers on W-channels 3, 11, 12 and 13, and the detected channel occupation by Wifi interferers when implementing the second embodiment for the sake of discrimination here of the four interferers especially in W-channels 11 to 13. W-channels 3, 11, 12 and 13 are well detected as being highly activated. However, the other W-channels 1,2,4,5,6,7,8,9,10 are not perturbed. For example, anyone of the channels 6,7,8,9 (5 MHz width) of W-channel 6 (20 MHz width) can be used then by the communication system. Therefore, an immediate application of that result would be to use for example channel 6 preferably to communicate over the ISM band.

Figure 5:
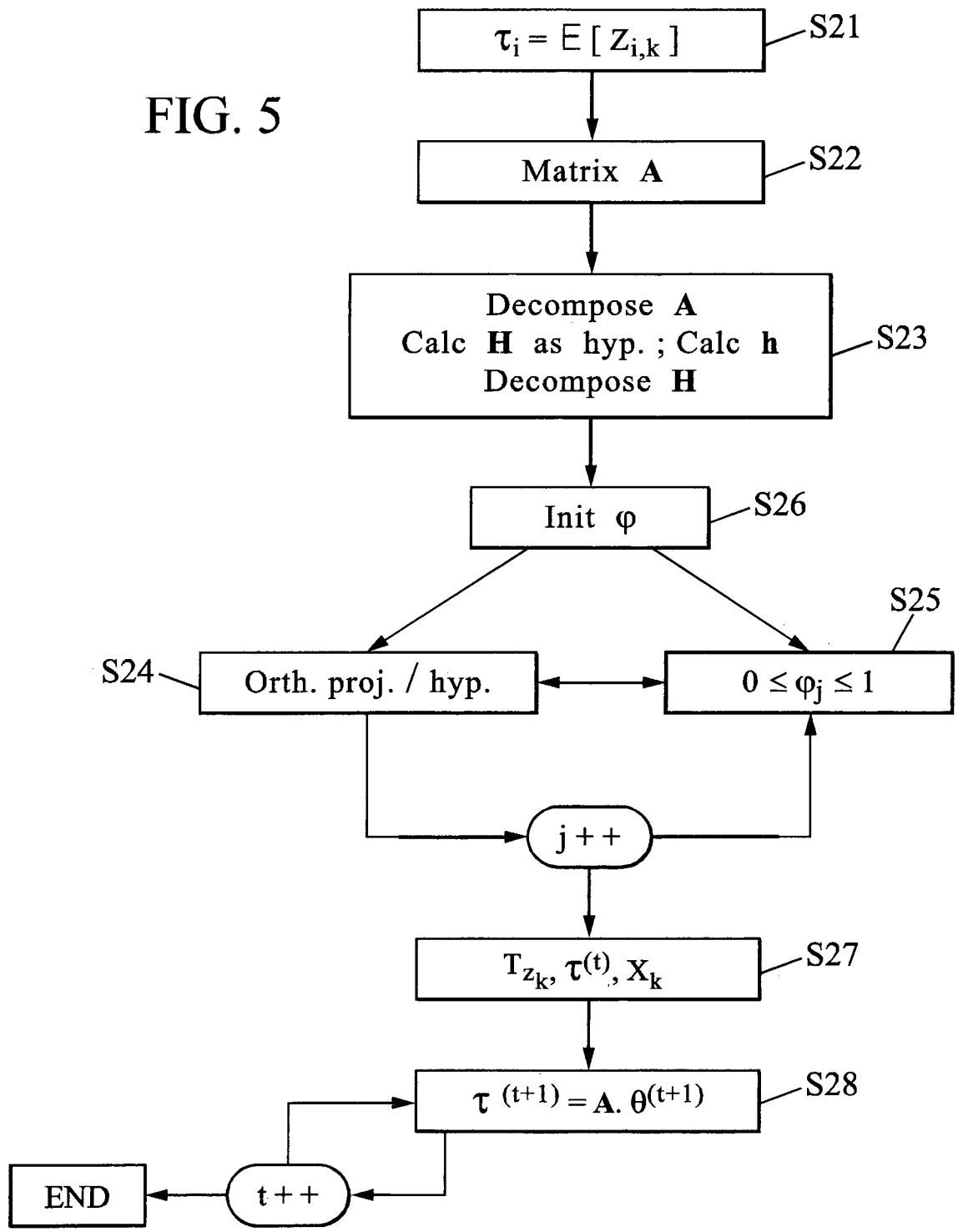
FIG. 5 shows an example of the main steps of a method according to a second embodiment of the invention.
Figure 7:
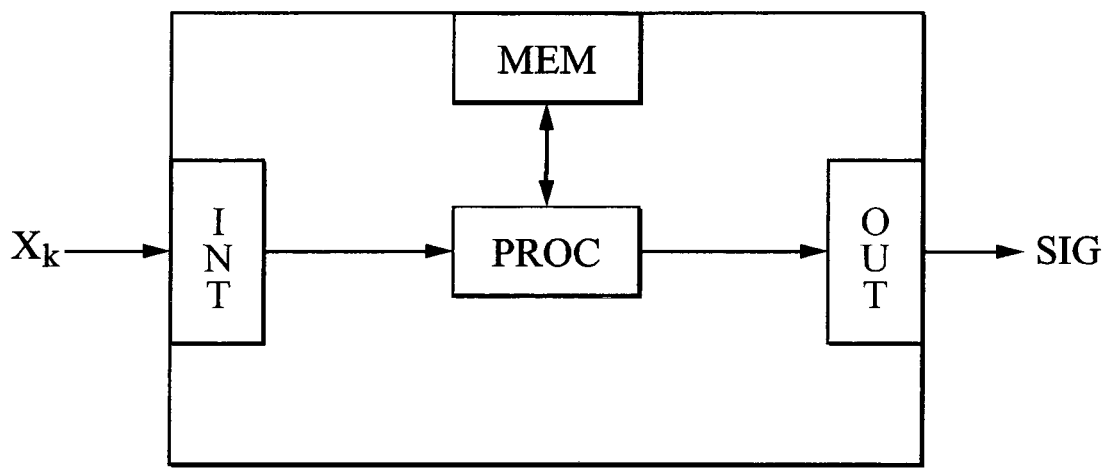
FIG. 7 shows schematically an example of a processing circuit of a device according to the invention.
Figure 8:
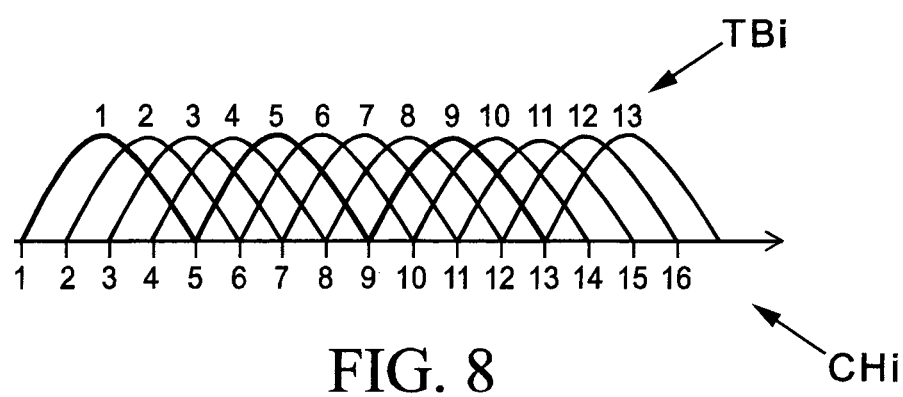
FIG. 8 shows the problem to be solved by the invention.

Of course, all the algorithms represented by flow charts of FIGS. 3, 4 and 5 are performed in practice by a computer running an appropriate computer program having an algorithm corresponding to one of those represented in FIGS. 3 to 5. Such a computer comprises as shown in FIG. 7:

An input interface INP to receive measurements $X_k$,
A memory MEM for storing at least the instructions of the aforesaid computer program,
A processor PROC for reading the instructions and running then the corresponding program, and
An output interface OUT for delivering a signal SIG including at least data related to activation rates of transmission bands by interferers, and possibly recommended channels identifiers to avoid these interferers.

The invention claimed is:

1. A method implemented by a computer for estimating interference on a radiofrequency system using a set of channels (CHi), said interference being caused by interferers of an interfering system using a set of transmission bands (TBi), each of said transmission bands extending on a plurality of contiguous channels of said set of channels, Wherein the method comprises:
Determining a set $\Omega$ of all possible configurations of occupation or non-occupation of said set of transmission bands, defined as a set of possible vectors $Z_k = [Z_{1,k}, \ldots, Z_{i,k}, \ldots Z_{I,k}]$ satisfying at a time instant k a non-overlapping condition of said radiofrequency system, said non-overlapping condition corresponding to the fact that only one interferer i, among a set of I possible interferers, can be active at a same time k on each channel of said set of channels and forming, with contiguous channels, a transmission band i,
Obtaining measurements $X_1, \ldots, X_k, \ldots, X_K$ of occupation of at least a part of said set of channels, at respective time instants k: $0 < k \leq K$, where K defines a given observation time window,
Performing probabilities calculations so as to determine, for each transmission band, an estimated activation rate i, on the basis of said measurements $X_1, \ldots, X_k, \ldots, X_K$, said estimated activation rate i corresponding to an occupation rate of a transmission band i by an interferer within said given observation time window.

2. The method according to claim 1, wherein said radiofrequency system implements a frequency hopping on said channels, and said obtaining measurements $X_1, \ldots, X_k, \ldots, X_K$ is performed according to a frequency hopping implementation.

3. The method according to claim 1, wherein said probabilities calculations follow an expectation-maximum approach which iteratively approximates a maximum likelihood solution, according to two steps at each iteration t:

a) For a fixed estimate $\tau^{(t)}$, define the expectation $Q(\tau | \tau^{(t)})$ such that $$Q(\tau | \tau^{(t)}) = E_{Z \in \Omega | X, \tau^{(t)}}[\log P(X, Z | \tau)]$$

b) Find the estimate $\tau^{(t+1)}$ that maximizes $Q(\tau|\tau^{(t)})$:

$$\tau^{(t+1)} = \arg\max_{\tau} Q(\tau \mid \tau^{(t)}),$$

and wherein successive t iterations of steps a) and b) lead to a converging solution giving said estimated activation rate $\tau^{(t+1)}$ for each transmission band.

4. The method according to claim 3, wherein each transmission band extends over J channels and wherein said probabilities calculations comprise steps of
1) computing the probabilities, $\forall k$, $\forall Z_k \in \Omega$, $P(X_k|Z_k)$, such as $$P(X_k \mid Z_k) = p_\eta \left( X_k - 1 + \prod_{j=0}^{J} (1 - Z_{f_{k-j},k}) \right)$$

where $p_\eta(\ )$ defines a probability relative to an estimation error on the measurements vector $X_k$,
2) computing then the probabilities $P(Z_k|\tau^{(t)})$, $\forall k$, $\forall Z_k \in \Omega$,
3) computing the values, $\forall k$, $\forall Z_k$, $T_{Z_k,\tau^{(t)},X_k}$, with:

$$T_{Z_k,\tau^{(t)},X_k} = \frac{P(X_k \mid Z_k)P(Z_k \mid \tau^{(t)})}{\sum_{Z'_k \in \Omega} P(X_k \mid Z'_k)P(Z'_k \mid \tau^{(t)})}$$

4) iteratively computing $\tau^{(t+1)}$ from the previously computed $T_{Z_k,\tau^{(t)},X_k}$
and wherein steps 2) to 4) are repeated iteratively until a stopping condition is met, the iteration index t being increased at each new iteration.

5. The method according to claim 4, wherein an approximation is made that the coefficients $Z_{i,k}$ are independent according to the interferer index i, and the probabilities calculations of $P(Z_k|\tau)$ are simplified into $P(Z_k|\tau^{(t)})=\Pi_i P(Z_{i,k}|\tau_i^{(t)})$
where $P(Z_{i,k}|\tau_i^{(t)})=(1-\tau_i^{(t)}))(1-Z_{i,k})=\tau_i^{(t)} \cdot Z_{i,k}$
and wherein the iterative computations 4) of $\tau^{(t+1)}$ are given by:

$$\forall i, \tau_i^{(t+1)} = \frac{1}{K} \sum_{k=1}^{K} \sum_{Z_k \in \Omega | Z_{i,k}=1} T_{Z_k,\tau^{(t)},X_k}.$$

6. The method according to claim 4, wherein steps 2) to 4) are performed by:
i. Defining a matrix A as follows:
$\forall Z \in \Omega$, $j \in [1,|\Omega|]$ the index of Z in $\Omega$, and $\forall i$, $A(i,j)=Z_i$
Where $|\Omega|$ is the cardinality of $\Omega$,
ii. Decomposing $A=U_A[\Delta_A 0_{I \times |\Omega|-I}][V_A^T W_A^T]^T$
where $V_A$ is of size $I \times I$ and $W_A$ is of size $(|\Omega|-I) \times I$
iii. Computing $H=[V_A^T 1_{I \times 1}]^T$ and $h(\tau^{(t)})=[(\Delta_A^{-1}U_A^T \tau^{(t)})^T 1]^T$ iv. Initializing a vector $\varphi=H^\#h(\tau^{(t)})$ of size equal to I
v. Computing $W_H$ from a decomposition of:
$H=U_H[\Delta_H 0_{I+1 \times |\Omega|-I-1}][V_H^T W_H^T]^T$
vi. Determining $\varphi$ on the basis of the calculation of
$W_H^T(W_H W_H^T)^{-1}W_H(\varphi-H^\#h(\tau^{(t)}))+H^\#h(\tau^{(t)})$
vii. Getting $P(Z_k|\tau^{(t)})=\varphi$
viii. Obtaining $\theta^{(t+1)}$ as:

$$\forall j, \theta_j^{(t+1)} = \frac{1}{K}\sum_{k=1}^{K} T_{Z_k=A_j,\tau^{(t)},X_k} \text{ and } \tau^{(t+1)} = A\theta^{(t+1)}.$$

7. The method according to claim 6, wherein step vi) is implemented by successive iterations for refining y according to two conditions considered alternatively from one iteration to the other:
an orthogonal projection of $\varphi$ on an hyperplane such as:
$\varphi \leftarrow W_H^T(W_H W_H^T)^{-1}W_H(\varphi-H^\#h(\tau))+H^\#h(\tau)$
and a projection of $\varphi$ in an hypercube such as:
$\varphi \leftarrow \max(\min(\varphi,1),0)$.

8. The method according to claim 1, wherein a number of said contiguous channels forming a transmission band is four, a total number of channels of said set of channels being sixteen.

9. The method according to claim 8, wherein each of said channels extends over 5 MHz, whereas each of said transmission bands extends over 20 MHz with a spread spectrum technology implementation.

10. The method according to claim 1, wherein said radiofrequency system implements an ISM type communication, while the interfering system implements a Wifi type communication.

11. The method according to claim 1, wherein said non-overlapping condition derives from a CSMA/CA multiple access implementation performed by said radiofrequency system, said CSMA/CA multiple access defining communication timeslots, and said measurements $X_k$ being collected at each timeslot k.

12. The method according to claim 1, comprising further a selection for communication of at least one channel among said set of channels, said selected channel being within a transmission band for which said estimated activation rate i is the lowest.

13. Computer program comprising instructions for performing the method according to claim 1, when these instructions are run by a processor.

14. Device for estimating interference on a radiofrequency system using the set of channels (CHi), said interference being caused by said set of possible I interferers of an interfering system using the set of transmission bands (TBi), each of said transmission bands extending on a plurality of contiguous channels of said set of channels, Said device comprising a processing circuit for performing the method according to claim 1.

15. A radiofrequency communication system, comprising the device according to claim 14 for estimating interference susceptible to occur on the set of channels to be used by the radiofrequency communication system.

* * * * *